United States Patent [19]

Okuno

[11] 4,298,869
[45] Nov. 3, 1981

[54] LIGHT-EMITTING DIODE DISPLAY
[75] Inventor: Yasuo Okuno, Sendai, Japan
[73] Assignee: Zaidan Hojin Handotai Kenkyu Shinkokai, Sendai, Japan
[21] Appl. No.: 52,014
[22] Filed: Jun. 25, 1979
[30] Foreign Application Priority Data Jun. 29, 1978 [JP] Japan ............... 53-79618

[51] Int. Cl.³ ............................................. G08B 5/36
[52] U.S. Cl. ............................ 340/782; 340/46; 340/332; 340/378.2; 340/701; 313/500; 357/17; 362/800
[58] Field of Search ............ 340/46, 84, 332, 366 R, 340/378 R, 782, 762; 313/500; 357/17; 362/800

[56] References Cited
U.S. PATENT DOCUMENTS

| 3,641,487 | 2/1972 | Rogers et al. | 340/46 |
| 3,673,462 | 6/1972 | Girard | 340/331 X |
| 3,737,647 | 6/1973 | Gomi | 357/17 X |
| 3,906,482 | 9/1975 | Morrison | 340/782 |
| 4,047,049 | 9/1977 | Erickson et al. | 340/762 X |
| 4,148,045 | 4/1979 | Fang et al. | 357/17 |
| 4,211,955 | 7/1980 | Ray | 312/800 X |
| 4,211,956 | 7/1980 | Bloyd | 340/782 X |

Primary Examiner—David L. Trafton
Attorney, Agent, or Firm—Cushman, Darby & Cushman

[57] ABSTRACT

A plurality of light-emitting diodes are connected in series to elevate the working voltage. A plurality of said series connection are connected in parallel to maintain display even upon a disconnection accident. The total number of light-emitting diodes provides a bright and failure-safe colored light display at a low power consumption. The conventional colored-light-emitting display can be easily substituted by the novel light-emitting diode display to reduce the power consumption and elongate the service lifetime.

40 Claims, 31 Drawing Figures

LIGHT-EMITTING DIODE DISPLAY

BACKGROUND OF THE INVENTION (a) Field of the invention:

The present invention relates to display, and more particularly it pertains to light-emitting diode display capable of emitting a large amount of colored light.

(b) Description of the prior art:

At present, most colored light-emitting displays rely on a combination of incandescent lamps and color filters, or neon signs. However, the power efficiency of these conventional colored-light emission systems is very poor. Moreover, an incandescent lamp, wherein the light source relies on thermal radiation, requires a very high temperature at its light-emitting portion, and hence has a short service lifetime. Incandescent displays require replacement in a relatively short period of time. In case of traffic signal lamps which are to be used continuously, the durability of the respective light sources is less than one year.

Recently, semiconductor light-emitting diodes (LED's) have shown a marked improvement in their working efficiency and service lifetime. Such LED's have become readily available. However, semiconductor light-emitting diodes are presently employed only as indicators on control panels, such as of electronic devices, and they are not typically used in light-emitting devices, such as displays.

Semiconductor light-emitting diodes have been accepted in general as having a high brightness, but only a small amount of light emission per piece, and as being driven by a low dc voltage. Also, a light-emitting diode is typically manufactured from a compound semiconductor material having a broad energy gap. The LED has a threshold voltage value inherent to the semiconductor material employed. Such known diodes show a sharp increase in current in response to the application of a voltage above the threshold voltage value. As such, the driving of a known light-emitting diode requires the provision of a power (current) limiting means of some kind or other. For this reason, a simultaneous driving of a large number of light-emitting diodes requires complicated power supplies, resulting in a high cost of manufacture, and poor practical power efficiency. Thus, known semiconductor light-emitting diodes have been considered not suitable for use in ordinary light-emitting display devices excepting for special purposes.

Recently, however, as stated above, the power efficiency and the service lifetime of light-emitting diodes have come to supersede considerably those of incandescent lamps. For example, a red light-emitting diode formed of gallium-aluminium arsenide (available from Stanley Electric Co. Ltd., Japan) can provide 650 nm lights of above 2.35 cd/watt. Especially, in case of colored-light display, an incandescent lamp is such that only a small part of the total amount of light emission can be utilized, whereas a light-emitting diode is capable of emitting light rays of only effective wavelengths. Thus, the relative efficiency of light-emitting diode is great as compared to the incandescent lamp.

However, the abovementioned factors have hindered the materialization wide range use of light-emitting diode displays, i.e. the problems of power supply source, and cost.

In order to drive a visible-light emitting diode, a forward voltage of about 1.5 V up to about 4 V (which is determined depending on the wavelength of emitting lights and the semiconductor material employed) is required. At an excessively low voltage, the diode will not emit light, whereas an application of an excessively high voltage will cause an overflow of current, leading to destruction of the diode. Thus, it is not possible to drive a diode or diodes directly by the most commonly used power sources such as commercial power supply source, batteries for automobiles and power generator for bicycles.

SUMMARY OF THE INVENTION

It is, therefore, an object of the present invention to provide a light-emitting diode display which is driven by a simple power supply system.

Another object of the present invention is to provide a light-emitting diode display which, even at the occurrence of failure of some of the component diodes, can work continuously with no marked drop in function.

Still another object of the present invention is to provide a light-emitting diode display featuring long service life, low power consumption and high brightness.

A further object of the present invention is to provide a light-emitting diode display device which can be used in a conventional colored light-emitting display device using incandescent lamps, without requiring modification of the structure.

According to an aspect of the present invention, there is provided a light-emitting diode display device comprising a plurality of light-emitting diode units connected in parallel, each unit including a plurality of light-emitting diodes connected in series. The series connection of light-emitting diodes conveniently enables the use of a power source of an appropriate voltage such as a commercial ac power source. The parallel connection of the light-emitting diode units prevents termination of display by a single disconnection and provides failure-safe display. The whole number of light-emitting diodes provides bright colored light display. A current-limiting means may be provided in each unit in series with the light-emitting diodes. Such current limiting means may be a resistor or a current-saturating transistor. A full-wave rectifying circuit may be connected between the input terminal and the parallel connection of the diode units. A smoothing circuit may also be connected to the full-wave rectifying circuit. Furthermore, a light-emitting diode display capable of ac and dc compatible use can be provided by selecting the number of light-emitting diodes connected in series. The power supply system in the conventional colored-light emitting display such as those of traffic signals can be directly used simply by assembling the diode display units in a housing having the conventional lamp base. A full-wave rectifying circuit and a charging-discharging means may also be assembled in the same housing. Light-emitting diode displays according to the present invention provide various advantages such as low power consumption, long service life and ease of repair.

Other objects, features and advantages of the present invention will become apparent from the following detailed descriptions of the preferred embodiments when taken in conjunction with the accompanying drawings.

DETAILED DESCRIPTION OF THE PREFERRED EMBODIMENTS

Figure 1A:
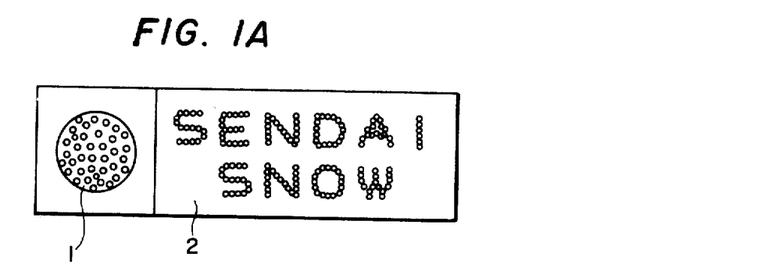
FIGS. 1A to 1C are schematic diagrams showing examples of colored-light emitting display to which the present invention is applicable.
Figures 1B, 1C:
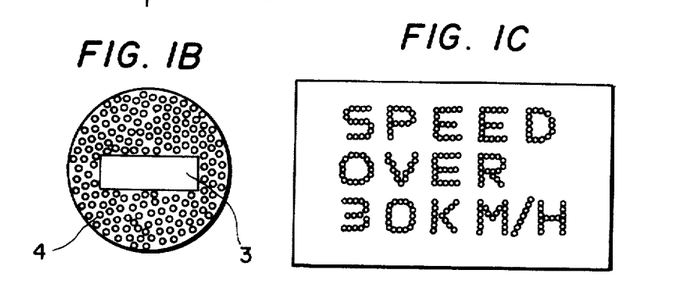

FIGS. 1A to 1C show examples of light-emitting display devices in the form of traffic or road signs to which the present invention is applied. FIG. 1A shows an example in which a signal lamp 1 and a lettered information indication panel 2 are combined to provide an integral sign unit. The signal lamp 1 provides a colored light display. The letter indication panel 2 carries thereon groups of spot light sources arranged in matrix or segment form and capable of displaying such information as place-name, weather condition and occurrence of accident and/or traffic jam. FIG. 1B shows an example of stationary display device, which is a road sign prohibiting thoroughfare. The centrally located rectangular area 3 is a white in color, and its surrounding area 4 emits red light. The central rectangular-shaped piece 3 may also be arranged to emit light. FIG. 1C is a lettered information indicator panel, and has a structure similar to that of the letter indication panel 2 shown in FIG. 1A. This indicator panel of FIG. 1C may be arranged so that the portion of indication which requires particular attention of the viewer is displayed in red, and the indication of the remaining portions may be made in yellow color or green color. Here, it is to be noted that a single light-emitting diode display surface can provide a plurality of colored lights since each constituent light-emitting diode is very small, and a multiplicity of light-emitting diodes can be assembled in a small area. For example, the signal lamp 1 of FIG. 1A can perform three-color indication.

In the past, the light sources of these light-emitting display devices have been mostly incandescent lamps. According to the present invention, these light sources are constructed by light-emitting diodes to improve power efficiency and service life, to provide display devices which can save electric power, are of greater safety and which are low in cost of manufacture.

Many of colored-light emitting display devices, especially traffic signal lamps and road signs, are intended to be used continuously for an extended period of time. Therefore, it is desirable that these devices have as long a service life as possible. It is also desirable that, even when failure of some of the device components occurs, the device maintains the ability to display the required sign or information, and that repair can be made easily and quickly. The light-emitting diode display device according to the present invention satisfied these requirements.

Light-emitting diodes have made such progress to this data that the colors of light emitted therefrom cover substantially the whole visible range. Ordinary color displays can be materialized by the use of the three colors, i.e. red, yellow and green (or blue). Red light can be produced by the use of $Ga_{0.7}Al_{0.3}As$ light-emitting diode, $GaAs_{0.7}P_{0.3}$ light-emitting diode, $In_xGa_{1-x}As_yP_{1-y}$ ($0 < (x$ or $y) < 1$) light-emitting diode and like diodes. Yellow light can be produced by such light-emitting diodes as $In_{0.3}Ga_{0.7}P$ light-emitting diode and $Al_{0.4}In_{0.6}P$ light-emitting diode. Green light can be produced by such diodes as GaP light-emitting diode, $In_{0.2}Ga_{0.8}P$ light-emitting diode, and $Al_{0.5}In_{0.5}P$ light-emitting diode. The wavelength of the light emitted by a light-emitting diode is determined substantially by the type of the semiconductor material employed and also by the impurity added to this semiconductor material. The light emission efficiency of a light-emitting diode is determined mainly by the type of the semiconductor material employed, the quality of the crystal, and the structure of the light-emitting diode. As the structure of light-emitting diode of high efficiency, multi-layered hetero-junction structure is used most frequently. Furthermore, it is effective for the improvement of efficiency of a light-emitting diode to strictly control the composition ratio between the respective constructural regions within the light-emitting diode, and to perform lattice matching between these regions to thereby reduce the number of defects. For example, a red light emitting diode having each layer grown from a solution at a constant growth temperature and under controlled vapor pressures exhibits a light emission efficiency exceeding 2.35 mcd/watt. Such light emission efficiency greatly supersedes the light emission efficiency of known colored light emitting display devices using, for example, incandescent lamps and filters.

Figure 1D:
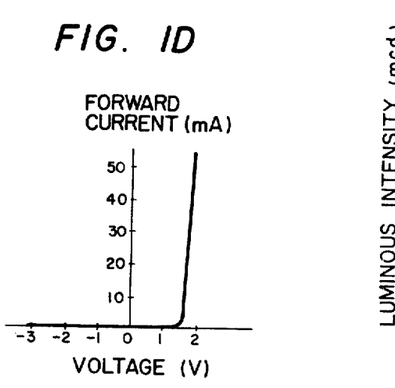
FIGS. 1D and 1E are diagrams showing a current versus voltage relationship and a luminous intensity versus current characteristics.
Figure 1E:
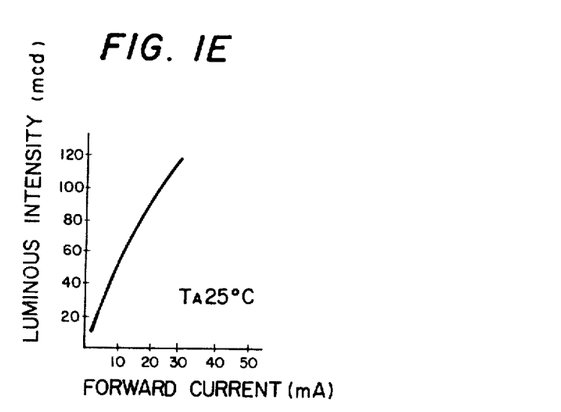

FIGS. 1D and 1E show characteristics of an example of red-light emitting diode, in which;

FIG. 1D shows a current (in milliamperes) versus voltage (in volts) relationship, and FIG. 1E shows relationship between luminous intensity (in millicandles) and forward current (in milliamperes). It can be readily seen that the current versus voltage characteristic is similar to that of a usual rectifying diode, and the luminous intensity varies almost linearly with a change in forward current.

By incorporating light-emitting diodes having such high efficiency into the structure of the present invention which will be described later, light-emitting diode display is obtained having low power dissipation, high efficiency, high brightness and long service lifetime.

The operating voltage for visible-light emitting diodes is about 1.5 to about 4 volts. That is, if a forward voltage applied to the diode exceeds a certain value within the range of about 1.5 to about 4 volts, the current flowing through the diode will exhibit a sharp increase, and the diode will produce an amount of light which is substantially proportional to this value of current. The reverse breakdown voltage of such diode can be made at least about twice the maximum permissible forward voltage, and usually above about 4 times the maximum permissible forward voltage. The operating voltage can vary, though slightly, for each light-emitting diode. Above this operating voltage, the amount of current will exhibit a sharp increase relative to the voltage increment, as shown in FIG. 1D. Therefore, it is dangerous to drive a light-emitting diode by applying a certain voltage across the terminals of this diode without controlling the current. This is because of the possibility that the passage of an excessive amount of current through the light-emitting diode will lead to destruction of the diode. This gives rise to the necessity for limiting the power (current) with which a light-emitting diode is driven. On the other hand, if a parallel connection of a large number of light-emitting diodes is driven, the current will assume a large value, necessitating the provision of low resistance wiring. In addition thereto, the provision of a large number of power controlling means will be required, and thus the cost of manufacture will rise greatly. Contrariwise, if a series connection of light-emitting diodes is driven, the level of the operating voltage required will become high, but the value of current can be made small. However, such series-connection display device has the disadvantage that the disconnection of a single component diode for some reason or other will cause an instantaneous stopping of emission of light from the remaining light-emitting diodes. Also, if a series connection of too many light-emitting diodes is made, the necessary driving voltage will become too high. A light-emitting diode display arrangement comprising a parallel connection of a plurality of units each being composed of a series connection of a plurality of light-emitting diodes can be driven by a simple power supply source, and produces much less convenience in the event of a connection failure.

Figure 2A:
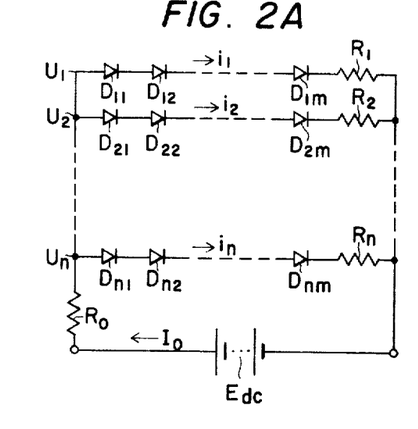
FIGS. 2A to 2E are circuit diagrams showing basic embodiments of the present invention.
Figure 2B:
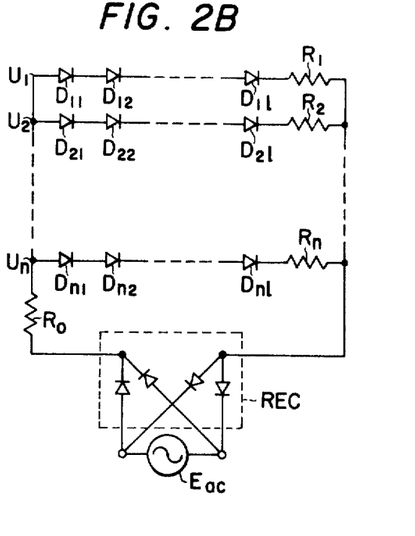
Figure 2C:
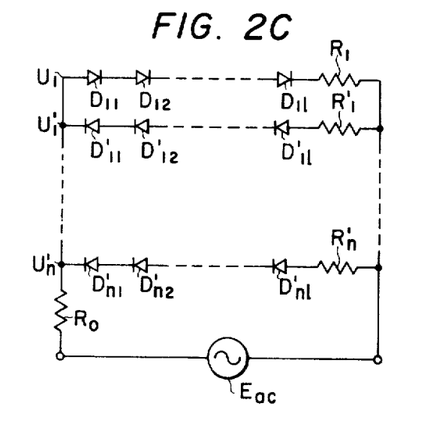

FIGS. 2A, 2B and 2C show some basic embodiments of the present invention. FIG. 2A shows an example of dc drive. FIG. 2B shows an example of full-wave rectified drive. FIG. 2C shows an example of an ac drive. In the embodiments shown in FIGS. 2A and 2B, they are identical in their basic structure that a plurality of series connections of light-emitting diodes are connected in parallel. FIG. 2C provides a parallel connection of a plurality of series connection of light-emitting diodes which are arranged in alternate opposite directions relative to each other.

In the embodiment of FIG. 2A, there are connected in parallel n rows of diode display units $U_i(U_1, U_2, \ldots U_n)$ each unit comprising a series connection of m pieces of light-emitting diodes. The j-th light-emitting diode in the i-th row is indicated by $D_{ij}$. In each unit $U_i$, a protective resistor $R_i$ is connected in series with the series connection of diodes (which may hereinafter be called a row of diodes). This resistor $R_1$ serves to limit the amount of current by absorbing excessive voltage as well as to provide balancing between the currents $i_1, i_2, \ldots i_n$ which flow through the respective units. A resistor $R_0$ represents a overall protective resistor for limiting the total amount of current flowing to the units. This resistor $R_0$ is intended to protect the display device in case of emergency such as short circuiting. This resistor $R_0$, however, is not always necessary, depending on the adoption of circuit breaker such as fuse, or on the manner of selection of the resistors $R_i$ in the respective units, and it may be omitted. For the sake of simplicity, it will hereinafter be assumed in the explanation that $R_0=0$. The connection of the diode display device and the power source $E_{dc}$ can be formed in the conventional socket and lamp base or plug and plug socket fashion. Let us here assume that the typical operating voltage of each light-emitting diode $D_{ij}$ is $v_{typ}$ and that the typical operating current of the diode is $i_{typ}$. The resistance $R_i$ within each display unit is then selected to be $(m \cdot v_{typ} + i_{typ} \cdot R_i) = E_{dc}$. In other words, $R_i$ is chosen so that when $i_{typ}$ is flowing, the sum of the operating voltage $(v_{typ} \times m)$ of the row of light-emitting diodes and the voltage drop $(i_{typ} \times R_i)$ due to the resistor $R_i$ becomes equal to the voltage $E_{dc}$ of the dc power supply source. If the dc voltage $E_{dc}$ has fluctuations of $E_{dco} \pm \Delta E_{dc}$, it is effective to select the number m of the light-emitting diodes in each unit to be relatively small and to select the resistance $R_i$ in each unit to be relatively great, in order that the illumination by the light-emitting diodes will not drop excessively when $E_{dc} = (E_{dco} - \Delta E_{dc})$. It is also effective to arrange the respective units to have different numbers of light-emitting diodes relative to each other, and have different resistances of the resistors $R_i$. For example, where a dc power supply source of $12 \pm 2$ V is used in conjunction with 4 rows ($V_1, V_2, V_3, V_4$) of red-color light emitting diodes having on operating voltage of $V_{typ}=1.8$ V and operating current of $i_{typ}=10$ mA, the first unit $U_1$ may be comprised of a series connection of 6 light-emitting diodes and a resistor $R_1$32 150Ω; the second unit $U_2$ may be comprised of a series connection of 5 light-emitting diodes and a resistor $R_2=250\Omega$; and the third unit $U_3$ may be of the same arrangement as that of the first unit $U_1$; and the fourth unit may be the same arrangement as that of the second unit $U_2$. In such an arrangement, both the first and the third units contain a series connection of 6 light-emitting diodes. Therefore, when the voltage $E_{dc}$ drops lower than $1.8 \times 6 = 10.8$ V, these units will almost cease to operate. Each of the second and the fourth units contains 5 light-emitting diodes connected in series, so that so long as the voltage $E_{dc}$ is $1.8 \times 5 = 9$ V or higher, these units will operate, although the current value will decrease. At the voltage $E_{dc}=12$ V, a current of about 8 mA flows through each of the first and the third units, whereas a current of about 12 mA will flow through each of the second and the fourth units. When the voltage $E_{dc}$ drops to 10 V, the first and the third units will almost cease to operate. However, a current of about 4 mA flows through each of the second and the fourth units, so that these units maintain emission of light. When the voltage $E_{dc}$ increases to 14 V, a current of about 21 mA flows through each of the first and the third units, and a current of about 20 mA will flow through each of the second and the fourth units. In the same way as stated above, various kinds of combinations can be made on the consideration of such factors as the value of the source voltage $E_{dc}$, the magnitude of fluctuation of this voltage, the operating voltage of the light-emitting diodes and the maximum permissible current. With these various combinations, it should be understood that, even when a certain unit ceases to be lighted up due to a marked drop in the voltage of the power supply source or due to the disconnection of one of the component light-emitting diodes of the unit, at least a minimum amount of emission of light can be maintained. It should also be appreciated that the average efficiency can be made high.

FIG. 2B shows an instance wherein light-emitting diodes are driven by a voltage $E_r=E_m|\sin \omega t|$ which represents full-wave rectified ac: $E_{ac}=E_m \sin \omega t$. The ac power supply source $E_{ac}$ may be a commercial power supply source, or it may be a power supply source obtained by dropping the voltage of the commercial power supply source by a transformer. The ac voltage, $E_{ac}=E_m \sin \omega t$, is rectified by full-wave rectifying circuit REC, into a full-wave rectified voltage $E_r=E_m|\sin \omega t|$. This voltage $E_r$ is applied, via the resistor $R_O$, to the respective diode units $U_1$, $U_2$ up to $U_n$. The arrangement of the resistor $R_O$ and that of the respective units $U_i$ are similar to those of the embodiment of FIG. 2A. It should be understood, however, that, since the rectified voltage $E_r$ has a sinusoidal shape, the reference for selection of the circuit constants becomes different from that of FIG. 2A. Its details will be stated later.

FIG. 2C shows an example of ac drive. Because the voltage is ac voltage, each unit operates every other half period. In the instant example, units $U_i$, in which light-emitting diodes are uniformly arranged in a certain direction and units $U_i'$, wherein the light-emitting diodes are arranged uniformily in the opposite direction, are arranged in alternate fashion, so that the device as a whole exhibits no dead half period. Two of units $U_i$ and $U_i'$ jointly serve a role equivalent to that of a single unit $U_i$ in the embodiment of FIG. 2B. The instant embodiment, however, is suitable for cases where failure-safe operation is demanded and where the drop of voltage of the rectifying circuit and the space occupied by this rectifying circuit present a problem.

As can be seen from FIGS. 2B and 2C, ac drive and full-wave rectified current drive can be provides by a device having a simple structure. However, the emission of light from light-emitting diodes using that mode of drive will be of an intermittent nature in accordance with the ac frequency or twice this ac frequency. The integrated amount of illumination will therefore be small. In order to increase the integrated amount of illumination, it is advantageous to smooth the half-wave rectified or full-wave rectified current into a quasi direct current. This reformation of the sinusoidal current is intended simply to prevent the voltage from dropping excessively, and therefore there is no need to rectify the alternate current into perfect direct current. Thus, the smoothing circuit may have a simple structure.

Figure 2D:
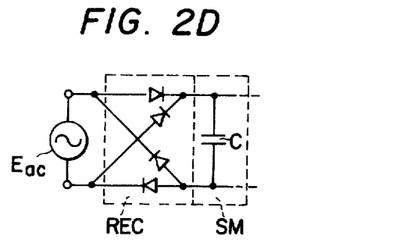

FIG. 2D shows an example of the most simple rectifying-smoothing circuit. In this example, the rectifying circuit REC carries out full-wave rectification, and the full-wave rectified waveform is smoothed by a capacitor C. For example, let us here assume that the alternating current supply source $E_{ac}$ has about 160 sin $\omega t$ volts (effective voltage being about 115 volts), and that the light-emitting diode circuit continues to allow a current of 20 mA to flow. In order to form a current of 20 mA for the period of 0.01 second, a charge of $0.01 \times 20 \times 10^{-3}=2\times 10^{-4}$ coulombs is necessary. If the operating voltage of the light-emitting diode circuit is 100 V, the voltage across the capacitor C will fluctuate between 100 V and 160 V. Accordingly, if the capacitance is above about $C=\Delta Q/\Delta V=2\times 10^{-4}/60 \approx 3$ $\mu$F, it is possible to drive the light-emitting diode circuit for substantially the full cycle. When the operating voltage of the diode circuit is 110, 120, 130, 140 and 150 volts, the least capacitance required for continuous display becomes about 4, 5, 7, 10 and 20 microfarads, respectively. If, however, as shown in the circuit of FIG. 2B, the limitation of current and the equalization of the current in each unit are carried out by a resistor, the current decreases as the voltage decreases so that the fluctuation of current caused by fluctuation of the voltage across the capacitor C will be great, but that display of reduced luminous intensity continues even if the capacitance is smaller than the value described above.

Figure 2E:
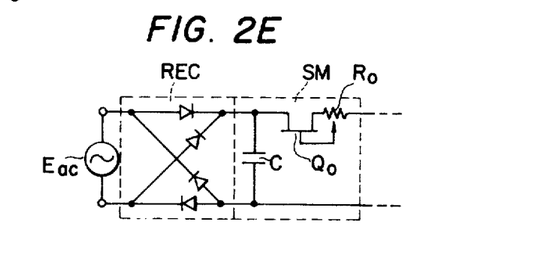

FIG. 2E shows an example wherein a smoothing circuit SM is formed by a charge storage capacitor C, a bias-adjusting variable resistor $R_O$ and a current-limiting field effect transistor (FET) $Q_0$. A large duty cycle is provided by utilizing the discharge from the capacitor C as in the case of FIG. 2D. SInce the maximum current is controlled by the FET, it is possible to suppress the fluctuation of current flowing the light-emitting diodes to a small level even if a resistor is employed as the power limiting means within each unit. This arrangement operates in such a manner that the fluctuation of voltage across the capacitor is absorbed by the FET. In other words the current at the initial period of discharge is limited by the FET, so that the duty cycle can be augmented. The current adjusting variable resistor $R_0$ can also fulfill the role of the protective resistor $R_0$ shown in FIGS. 2A, 2B and 2C. Further, the power (current) limiting means can also be formed by other elements such as an FET, as well as by the resistors $R_i$ of FIGS. 2A to 2C.

A light-emitting diode, as shown in FIG. 1D, basically exhibits an exponential current-voltage characteristic: $J=J_s[\exp (qV/kT)-1]$. Accordingly, above the inherent operating voltage in the vicinity of the value of the forbidden band gap, the current will be increased greatly by a slight increase in the voltage. If a light-emitting diode is driven by a voltage which fluctuates largely, as in the case of sinusoidal waveshape of voltage, care has to be taken to ensure that the value of the maximum voltage across the diode will not become excessively large. Description will hereunder be made first with respect to the instance wherein the supply voltage has a sinusoidal shape.

Figure 3A:
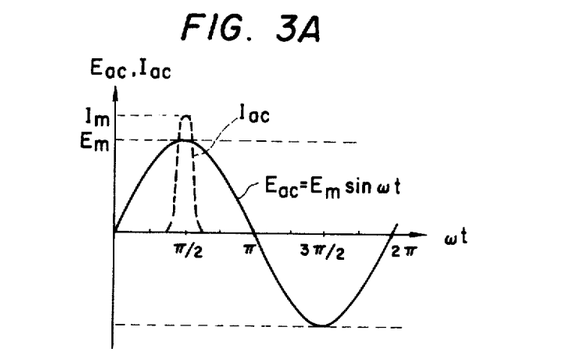
FIGS. 3A to 3G are diagrams of voltage and current waveforms for explaining the operation of the basic embodiments of the present invention shown in FIGS. 2A to 2E and 4A.
Figure 3B:
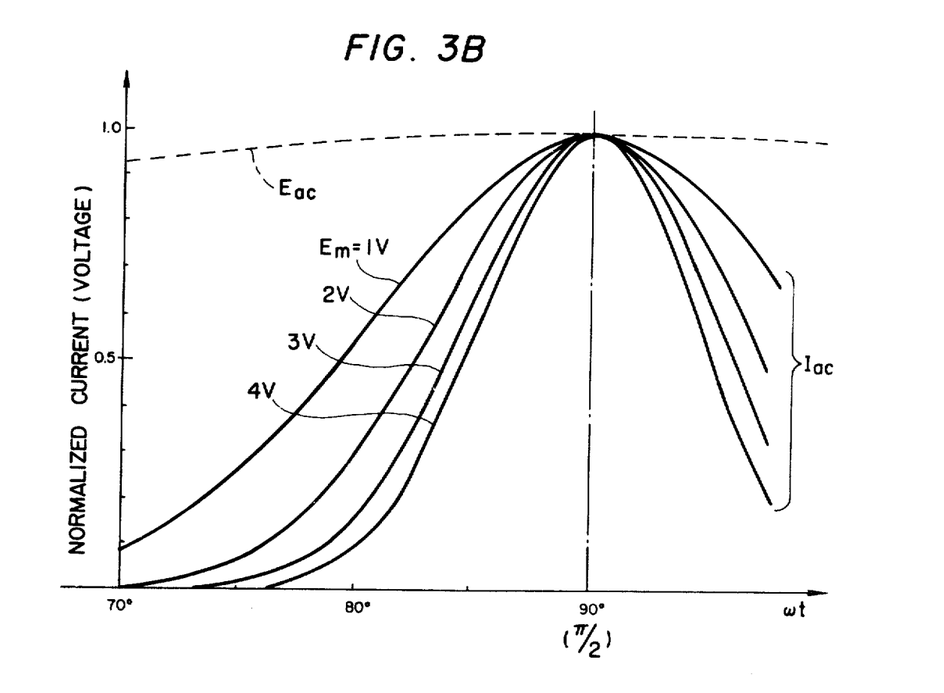
Figure 3C:
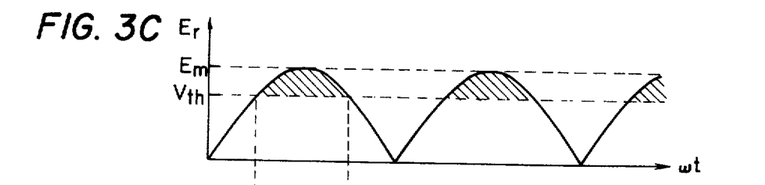
Figure 3D:
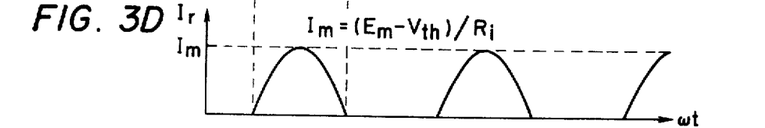

FIG. 3A shows the waveform of ac voltage of $E_{ac}=E_m \sin \omega t$. Let us here consider the instance wherein a light-emitting diode is driven by the ac voltage $E_{ac}=E_m \sin \omega t$ shown in solid line in FIG. 3A. If an appropriate maximum operating current $I_m$ is caused to flow through the light-emitting diode at the maximum voltage value $E_m$, the current $I_{ac}$ which flows through this light-emitting diode will exhibit a sharp decrease in accordance with a decrease in the voltage. The current $I_{ac}$ is schematically shown by broken line. The manner of variation of this current $I_{ac}$ is shown in a large scale in FIG. 3B. The waveform $E_{ac}$ of the ac voltage is shown by a broken line, and the value of current when the light-emitting diode is driven by an ac voltage having a maximum voltage $E_m=1, 2, 3$ and $4$ V is shown by a solid line. In this illustration, the maximum value is normalized to 1 for both the voltage and the current. When $E_m=1, 2, 3$ and $4$ V, the angles at which the current $I_{ac}$ becomes one half of the maximum value $I_m$ are about 79.3°, 82.5°, 83.8° and 84.7°, respectively. The periods of time when the current becomes $I_{ac}>I_m/2$ are only about 5.9%, 4.2%, 3.4% and 3.0%, respectively, of the whole cycle. Also, if the light-emitting diode is driven by a full-wave rectified voltage $E_r=E_m|\sin \omega t|$, there is no longer any half cycle of the reverse voltage, and a forward voltage is applied in every cycle period. Accordingly, the periods of time satisfying the condition $I_{ac}>I_m/2$ will become twice those mentioned above. But these periods of time will still amount at most to only about 10% of the whole cycle. In such pulsating drive, the amount of illumination per diode will decrease. For example, in case the duty cycle is 1/20 (1 msec), it is not possible to cause a flow which is 20 times as large as the current required by a dc drive. As such, the amount of illumination and/or the efficiency per diode will drop. In order to increase the duty cycle, it is effective to arrange the operating voltage of each row of light-emitting diodes to be lower than the maximum value of sinusoidal waveform, and to consume the increment portion of the voltage by such means as the voltage absorbing means as in the case of the resistor $R_i$ in FIGS. 2B and 2C. In FIGS. 3C and 3D are shown the waveform of voltage and the waveform of current, respectively, in the instance wherein the operating threshold voltage $V_{th}$ of each row of light-emitting diodes in the circuit of FIG. 2B is set lower than the maximum voltage $E_m$. In these Figures, $V_{th}$ is selected so as to be $E_m/\sqrt{2}$ (so-called effective value). It has been assumed that no current flows until the threshold voltage $V_{th}$ is attained. When $E_{ac}$ exceeds $V_{th}$, the row of light-emitting diodes is rendered to the conducting state, and the current tends to increase. As the current increases, the voltage drop due to the resistor $R_i$ tends to become greater. Above the threshold voltage value $V_{th}$, the voltage across the light-emitting diode can be regarded as exhibiting almost no change. Therefore, it may be approximated that a voltage $V_{th}$ is applied to the row of diodes, and that a remaining voltage $(E_r - V_{th})$ is applied to the resistor $R_i$. Accordingly, the current which is caused to flow will become $(E_r - V_{th})/R_i$. The maximum current will be determined by $(E_m - V_{th})/R_i$. In case of $V_{th}/E_m = 1/\sqrt{2}$ as shown, the period of time in which $E_r \geq V_{th}$ is satisfied and a current is allowed to flow will be ½ of the whole cycle. The change of duty cycle, i.e. ratio of the operating period $(E_r > V_{th})$ to the whole cycle, with respect to the various selection of the value of $V_{th}/E_m$ in the case of sinusoidal voltage is listed in table I.

TABLE I

| $V_{th}/E_m$ | 0.99 | 0.98 | 0.97 | 0.96 | 0.95 | 0.94 | 0.93 |
|---|---|---|---|---|---|---|---|
| duty cycle | 0.09 | 0.13 | 0.16 | 0.18 | 0.20 | 0.22 | 0.24 |
| $V_{th}/E_m$ | 0.92 | 0.91 | 0.90 | 0.85 | 0.80 | 0.75 | $1/\sqrt{2}$ |
| duty cycle | 0.26 | 0.27 | 0.29 | 0.35 | 0.41 | 0.46 | 0.50 |
| $V_{th}/E_m$ | 0.70 | 0.65 | 0.60 | 0.55 | 0.50 | | |
| duty cycle | 0.51 | 0.55 | 0.59 | 0.63 | 0.67 | | |

As shown above, by reducing the value of $V_{th}/E_m$, the duty cycle can be augmented. However, the power which is consumed by the power-limiting means such as resistor, will increase correspondingly.

With respect to each row of diodes shown in FIG. 2B, let us now determine the power efficiency $\eta$ by assuming that the operating threshold voltage of each row of diodes is $V_{th}$, the supply voltage is $E_r = E_m |\sin \omega t|$, the current-limiting series resistance is $R_i$, and the current is I. Let us also assume that each row of diodes will be rendered "on" when the applied voltage is equal to or above $V_{th}$, and that it is rendered "off" at a voltage smaller than $V_{th}$, and also that the angle at which $E_m |\sin \omega t_1| = V_{th}$ is satisfied within the quarter cycle of $0° \leq \omega t = \theta \leq 90°$ is $\omega t_1 = \theta_1$. The total consumed power $P_t$ will be:

$$P_t = \int E_r \cdot I d\theta = \int_{\theta_1}^{\pi/2} E_m \cdot \sin\theta \cdot \frac{(E_m \sin\theta - V_{th})}{R_i} d\theta$$

-continued $$= \frac{E_m^2}{R_i} \int_{\theta_1}^{\pi/2} \sin^2\theta - \frac{E_m V_{th}}{R_i} \int_{\theta_1}^{\pi/2} \sin\theta \, d\theta.$$

and the effective power which is consumed by each row of diodes will be:

$$P_{eff} = \int V_{th} \cdot I d\theta = \int_{\theta_1}^{\pi/2} V_{th} \cdot \frac{(E_m \sin\theta - V_{th})}{R_i} d\theta$$

$$= \frac{E_m V_{th}}{R_i} \int_{\theta_1}^{\pi/2} \sin\theta \, d\theta - \frac{V_{th}^2}{R_i} \int_{\theta_1}^{\pi/2} d\theta.$$

and the power efficiency $\eta_r$ will be:

$$\eta_r = \frac{P_{eff}}{P_t} = \frac{V_{th}\left[E_m \int_{\theta_1}^{\pi/2} \sin\theta \, d\theta - V_{th} \int_{\theta_1}^{\pi/2} d\theta\right]}{E_m\left[E_m \int_{\theta_1}^{\pi/2} \sin^2\theta \, d\theta - V_{th} \int_{\theta_1}^{\pi/2} \sin\theta \, d\theta\right]}.$$

If $V_{th} = 0.9 E_m$, $\theta_1 = 1.12$ rad., and $$\eta_r = 0.9 \frac{\left[\int_{1.12}^{\pi/2} \sin\theta \, d\theta - 0.9 \int_{1.12}^{\pi/2} d\theta\right]}{\left[\int_{1.12}^{\pi/2} \sin^2\theta \, d\theta - 0.9 \int_{1.12}^{\pi/2} \sin\theta \, d\theta\right]}$$

$$= 0.92$$

If $V_{th} = 0.95 E_m$, $\theta_1 = 1.25$ rad., and $\eta_r = 0.96$.
If $V_{th} = 0.8 E_m$, $\theta_1 = 0.927$ rad., and $\eta_r = 0.83$.
If $V_{th} = (1/\sqrt{2}) E_m$, $\theta_1 = \pi/4$ rad., and $\eta_r = 0.75$.
If $V_{th} = 0.6 E_m$, $\theta_1 = 0.644$ rad., and $\eta_r = 0.65$.

The above-mentioned results will be tabulated in Table II below.

TABLE II

| | Resistive Load | | | | | | | |
|---|---|---|---|---|---|---|---|---|
| $V_{th}/E_m$ | 0.95 | 0.9 | 0.8 | $1/\sqrt{2}$ | 0.6 | 0.5 | 0.4 | 0.2 |
| Efficiency, $\eta_r$ | 0.96 | 0.92 | 0.83 | 0.75 | 0.65 | 0.56 | 0.46 | 0.24 |
| duty cycle | 0.20 | 0.29 | 0.41 | 0.50 | 0.59 | 0.67 | 0.74 | 0.87 |

From these results, it will be understood that, in case a light-emitting diode is driven by a sinusoidal voltage using a resistive load, duty cycle and power efficiency are basically determined by the ratio $V_{th}/E_m$. The closer to 1 the ratio $V_{th}/E_m$ is, the better power efficiency is obtained, but the duty cycle becomes smaller. On the other hand, the smaller the ratio $V_{th}/E_m$ is, the greater the duty cycle increases, but the power efficiency drops. When non-linear type increase of duty cycle is considered, $V_{th}/E_m$ preferably is about 0.9 or smaller, and from the viewpoint of power efficiency, $V_{th}/E_m$ preferably is about 0.5 or greater.

If it is intended to utilize a light-emitting diode display system driven by a standard dc power source as a replacement for a conventional candescent lamp display system driven by a standard ac power source, it would be desirable that such a system be compatible with both dc and ac power supplies of a same effective voltage. In such case, it is necessary that $V_{th}/E_m < 1/\sqrt{2}$. However, a better power efficiency is obtained from a higher value of $V_{th}/E_m$. Therefore, the desirable ratio is $V_{th}/E_m \approx 0.7$, and when the fluctuations in the dc power supply source are taken into consideration, the desirable ratio is $0.7 \gtrsim V_{th}/E_m \gtrsim 0.6$, and normally $0.7 \gtrsim V_{th}/E_m \gtrsim 0.65$ is preferable.

In FIGS. 2B and 2C, a resistor is employed to absorb an excessive voltage. Accordingly, the current will vary substantially proportional to excessive voltage which is expressed by $(E_{ac} - V_{th})$ or $(E_r - V_{th})$.

Therefore, in the voltage region where the excessive voltage is small, the value of current is small, and in the voltage region where the excessive voltage is great, the value of current is large. These facts give adverse effects upon the integrated amount of illumination and upon the power efficiency.

Figure 3E:
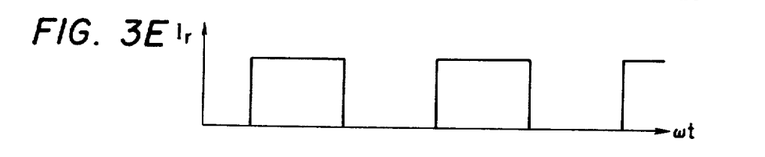

In case a current stabilizing means is employed in place of a resistor, it is possible to allow a substantially constant current to flow throughout the conducting period of light-emitting diodes, so that it is possible to improve both the integrated amount of illumination and the power efficiency. In FIG. 3E a current waveform for $V_{th}/E_m$ equal $1/\sqrt{2}$ as stated above, an ideal constant current supply means is shown. If the maximum value of current is the same, the power which is consumed by the light-emitting diodes (accordingly the integrated amount of illumination) will become about 1.5 times as great. So long as the period $E_r > V_{th}$ continues, the value of current is kept constant ($I_0$), so that the power efficiency $\eta_{cc}$ will become:

$$\eta_{cc} = \frac{\int_{\theta_1}^{\pi/2} V_{th} I_0 \, d\theta}{\int_{\theta_1}^{\pi/2} E_r I_0 \, d\theta} = \frac{V_{th} I_0 \int_{\theta_1}^{\pi/2} d\theta}{E_m I_0 \int_{\theta_1}^{\pi/2} \sin\theta \, d\theta} = \frac{V_{th}}{E_m} \frac{(\pi/2 - \theta_1)}{\cos\theta_1}$$

Power efficiencies $\eta_{cc}$ for various values the ratio $V_{th}/E_m$ are compared with the power efficiency $\eta_r$ obtained from the use of a resistor are shown in the following Table III. The integrated amount of illumination for constant current drive is about 1.5 times as great as that of the resistive current drive for the same maximum current throughout the listed range.

TABLE III

| Efficiency, Constant Current vs. Resistive Current | | | | | | | | |
|---|---|---|---|---|---|---|---|---|
| $V_{th}/E_m$ | 0.95 | 0.9 | 0.8 | $1/\sqrt{2}$ | 0.6 | 0.5 | 0.4 | 0.2 |
| duty cycle | 0.20 | 0.29 | 0.41 | 0.50 | 0.59 | 0.67 | 0.74 | 0.87 |
| $\eta_{cc}$ | 0.97 | 0.93 | 0.86 | 0.79 | 0.70 | 0.60 | 0.51 | 0.28 |
| $\eta_r$ | 0.96 | 0.92 | 0.83 | 0.75 | 0.65 | 0.56 | 0.46 | 0.24 |

It will be understood from Table III that, where the power-limiting means is comprised of a current stabilizing means, the improvement of power efficiency becomes prominent especially when $V_{th}/E_m$ is about 0.9 or smaller, as compared with the instance wherein the power-limiting means is comprised of a resistor. Accordingly, if it is intended to drive light-emitting diodes for a large amount of illumination and high power efficiency, it is effective to carry out limitation of power by relying on current stabilizing means. This is especially true when the ratio $V_{th}/E_m$ of a sinusoidal voltage is about 0.9 or lower, and for more prominent improvement, about 0.8 or smaller. Also, the employment of a current stabilizing means will enable the current to be kept at a constant value even when an accidental high voltage is applied, so that light-emitting diodes can be protected with an increased safety.

The current stabilizing means for supplying a constant current suitably comprise known devices such as a bipolar transistor, junction gate FET, insulated-gate FET or bipolar-mode static induction transistor (B-SIT). A B-SIT can be driven in almost the similar manner as that of the bipolar transistor (cf. IEDM Technical Digest 1978).

Figure 4A:
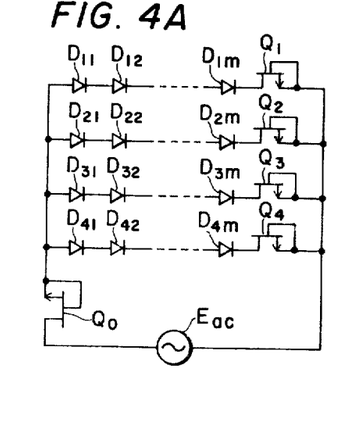
FIG. 4A is a circuit diagram of another basic embodiment.
Figure 4B:
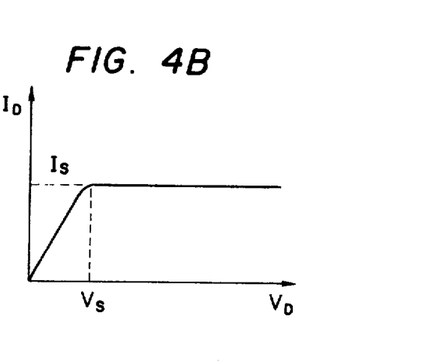
FIG. 4B is a current versus voltage characteristic diagram of a field effect transistor employed in the circuit of FIG. 4A.

In FIGS. 4A and 4B, there is shown an example wherein junction FET's are used. In FIG. 4A, n-channel junction FET's $Q_1$, $Q_2$, $Q_3$ and $Q_4$ each having its gate directly coupled to its source are connected in series to the rows of light-emitting diodes, respectively, to limit the currents. An example of the current-voltage characteristic of these n-channel FET's $Q_1$, $Q_2$, $Q_3$ and $Q_4$ is shown in FIG. 4B. With an increase in the drain voltage $V_D$, the drain current $I_D$ will build-up during the initial period of time and soon will become saturated. In this example, FET's of the type that maintain a saturated current $I_s$ at a predetermined current value such as 10 mA or 20 mA are employed. The voltage $V_s$ for causing the current to saturate (saturating voltage) desirably is low. The saturating voltage $V_s$ can be made to a level of, for example, about 0.5~1 V. When the voltage across the terminals of FET's $Q_1, \ldots, Q_4$ exceeds the saturating voltage $V_s$, the current which flows through each unit (row of light-emitting diodes) will be $I_s$ and almost constant. Accordingly, even where there is some variance in the characteristic of the light-emitting diodes, excessive current flows through any one unit will be prevented by the functions of these transistors $Q_1, \ldots, Q_4$. In this example, the provision of the transistor $Q_0$ is not always necessary, but this transistor may be provided there to ensure greater safety. If this transistor $Q_0$ is provided, it is only necessary to arrange so that a saturating current which is about 4 times as large as that of the saturated current $I_s$ of the transistors $Q_1, \ldots, Q_4$ is allowed to flow to transistor $Q_0$.

In the instant example, the transistors $Q_1, \ldots, Q_4$ and $Q_0$ are shown to be n-channel junction FET's. It should be understood, however, that they may be p-channel junction FET's or they may be depletion-mode insulated-gate type FET's each having its gate directly coupled to its source. The saturation of the current may not be perfect as shown in FIG. 4B. Any characteristics being upwardly concave can be used. Bipolar transistors and B-SIT's also can be used instead of FET's, although the circuit arrangement becomes a little bit complicated. In particular, B-SIT's which have very low saturating voltages, e.g. below 0.2 volts, can be used effectively.

In the circuit shown in FIG. 4A, no current will flow for each half cycle of alternating current. In order to arrange this circuit to operate for full cycle, arrangement of light-emitting diode units may be made, as shown in FIG. 2C, so that one half of the units of light-emitting diodes, e.g. the first unit and the second unit, including the FET's $Q_1$ and $Q_2$, are both provided in a direction opposite to that of the other units (reverse polarity). The FET $Q_0$ desirably is replaced by FET's $Q_0'$ and $Q_0''$ (not shown) which are connected in parallel but in the opposite direction to each other.

In case of such opposite parallel arrangement of the light-emitting diode units which is ac-driven, the employment of batteries to serve as an emergency power supply source will result in lighting up only one half of the whole light-emitting diodes at the time of operation by the emergency power supply source, so that it is possible to prolong the service lifetime of this emergency power supply source.

Traffic display devices are installed at places where the external environmental conditions change severely depending on the place, the season and the time of a day. Therefore, such traffic display devices are required to operate stably for each of the severe circumstances such as a high temperature condition of glazing sunlight during the mid-summertime and also under a low temperature condition of night time in mid-winter in cold districts. Since an FET can be designed so that its temperature characteristic is almost zero, FET's can be advantageously used to obtain a display device which operates stably. It is needless to say that some other temperature-compensating device can be connected to the FET-carrying display device for the sake of compensation for temperature. It should be understood also that the transistors intended for limiting current which are connected to the respective rows of light-emitting diodes are not limited to FET's. Any device may be employed so long as it has a substantial current stabilizing characteristic.

In the circuit shown in FIG. 4A, each light-emitting diode will emit light only intermittently. It should be understood, however, that by the provision of a full-wave rectifying circuit in a manner as provided at the power supply source portion shown in FIG. 2B, the frequency of illumination will double, and thus it is possible to increase the integrated amount of illumination. In such case also, as shown by the current waveform of FIG. 3E, the light-emitting diode will not operate in a substantial part of the whole cycle. In order to further increase the proportion of illumination time relative to the whole cycle (meaning: duty cycle) without dropping the power efficiency, it is advantageous to use a charge storage means such as capacitor.

As shown in FIG. 2D, the connection of a capacitor C to a rectifying circuit will provide the operation that the charging-up is performed as the ac voltage value rises, and that discharge is performed when this value becomes small. Therefore, it is possible to prolong the operating time of the light-emitting diodes.

Figure 3F:
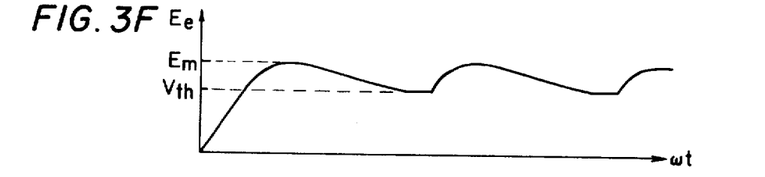
Figure 3G:
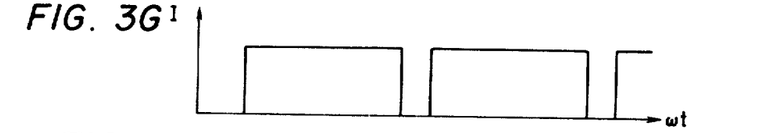

In FIG. 3F is shown an example of waveform of the voltage $E_c$ across the capacitor C which is supplied to the light-emitting diode circuit wherein a capacitor C is used. As in the preceding example, $V_{th}/E_m$ is set at $1/\sqrt{2}$. The charge-up time constant is assumed to be sufficiently small. At the build-up portion of the rectified voltage $E_r$, the capacitor is charged up, and at the decay of this voltage, it starts discharging. When the voltage $E_c$ drops to the operating voltage $V_{th}$ before the voltage $E_r$ rises again up to $V_{th}$, the current will no longer flow through the diode circuit. As a result, emission of light ceases, and $E_c$ will not drop beyond $V_{th}$. When, however, $E_r$ exceeds $V_{th}$ again, a constant current will start to flow, and also the capacitor is charged up. In FIG. 3G is shown the waveform of such current flowing through the light-emitting diodes. It will be apparent from comparison with FIG. 3E that the addition of the capacitor C is effective for the increasing of the duty cycle. FIGS. 3F and 3G show the case where the ratio $V_{th}/E_m$ is $1/\sqrt{2}$ and the duty cycle is about 0.85. When the maximum voltage $E_m$ is about 160 volts and the operating current is 10 mA, the required capacitance is only about 1.3 microfarads. It will be clear also that, by increasing the value of this capacitor, it is possible to light up light-emitting diodes in full cycle. Since the driving current of the light-emitting diodes can be small, the capacitor C also can be small. Therefore, the size of this capacitor need not become large. It is also possible to assemble a rectifying circuit, a capacitor and a light-emitting diode circuit into an integral structure of a size on the same order as or smaller than that of the incandescent lamp.

If a half-wave rectification system is employed, the rectifying circuit need to have only a single diode, so that the structure becomes simplified. Such arrangement, however, will lead to an increase in capacitance required, so that it is desirable to adopt such arrangement only for a limited purpose. The operating threshold voltage $V_{th}$ is such that the closer to the maximum voltage $E_m$ the threshold voltage is, the better the power efficiency will become. However, in order to maintain a large duty cycle, a large capacitor will be needed.

If it is not desirable, from the aspect of, for example, manufacturing cost, to provide a current stabilizing means in each row of light-emitting diodes, the employment of a power supply source portion having such current stabilizing function as shown in FIG. 2E will enable one to obtain a similar effect even when a resistor is inserted in each unit of light-emitting diodes. In such case, in order to improve the power efficiency, the resistor $R_i$ desirably has as low a value as possible. Therefore, it is desirable to arrange the combination of the light-emitting diodes within each row of these diodes in such way that the operating voltage for each row of light-emitting diodes becomes uniform. For example, when it is intended to combine about 50 individual light-emitting diodes having an operating voltage of $2 \pm 0.3$ V in their light-emitting state to produce a row of light-emitting diodes having an operating voltage of 100 V, the first step is to connect about 40 pieces of light-emitting diodes in indiscriminate fashion. The characteristic of the row of 40 diodes is then determined by allowing a predetermined current to flow through the series connection of these light-emitting diodes. Thereafter, about 10 additional individual light-emitting diodes having known characteristics are combined with the aforementioned about 40 diodes, so that the overall operating voltage will become about 100 V. It is also desirable to select the value of the resistor $R_i$ to equalize the operating characteristics of the rows of diodes. Needless to say, the characteristics of all those light-emitting diodes which are to be used may be tested and classified, and the tested diodes are combined together as required to obtain a desired certain operating voltage.

In order to equalize the characteristics of the respective rows of light-emitting diodes, it is desirable to use those diodes having a substantially uniform center wavelength of the emitting light, and to equalize the number of those diodes constituting the respective rows of diodes. The operating voltage of a diode contains a component which is determined by the type of material constituting the diode and also a component which is determined by the internal resistance of this diode. However, so long as the wavelengths of the emitting light are substantially uniform, there should be little variance in the value of the operating voltage which is attributable to the material constituting the diodes. Accordingly, the variance in the operating voltage when diodes of a same number are connected together will represent mainly the variance due to the internal resistance of the diodes. If the sum of the internal resistance and of the external resistance are rendered to certain constant values, it is possible to eliminate substantially the variance attributable to the internal resistance.

Figures 5A, 5B, 5C:
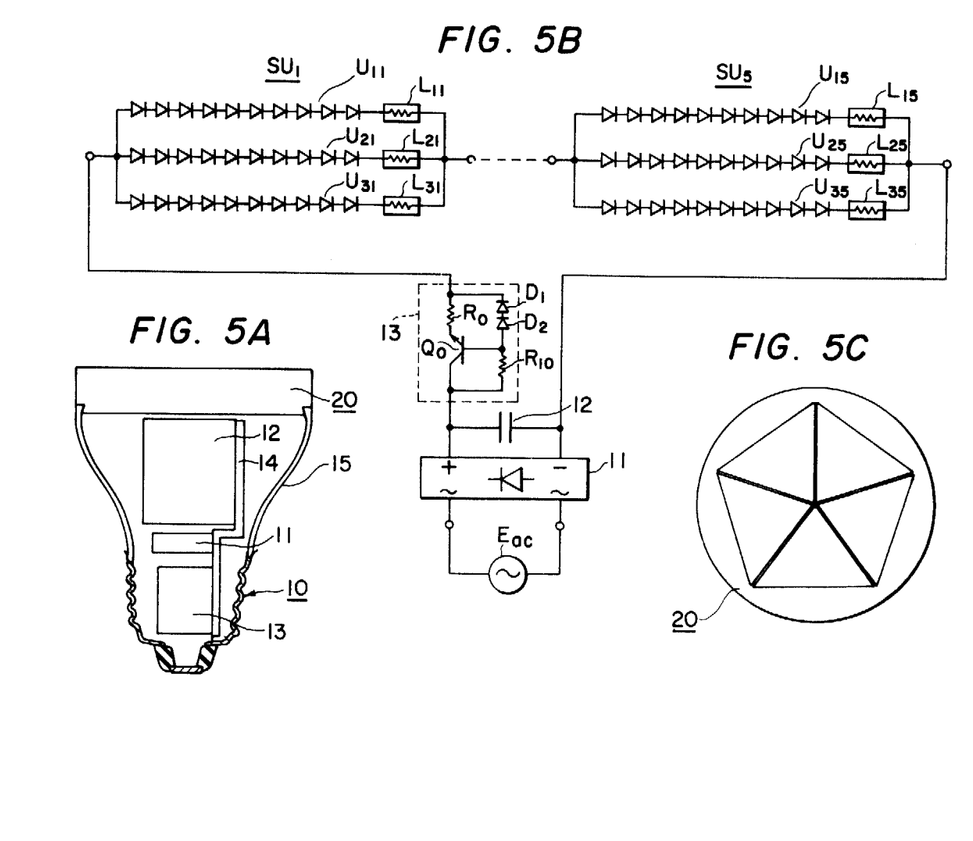
FIGS. 5A to 5C are a schematic cross-sectional view, a circuit diagram and a schematic plan view of a light-emitting diode lamp according to a further embodiment of the present invention.

In FIGS. 5A to 5C, there is shown a concrete example of light source for traffic signal light. This example can be used in place of incandescent lamp of signal light which is operated by commercial alternating current source.

In FIG. 5A, the light-emitting diode lamp includes a current-controlling circuit housed within a truncated bulbous housing 15. Housing 15 includes a lamp base 10 similar to the base of conventional incandescent light bulbs. A light-emitting portion 20 is placed at the head portion of housing 15. For the sake of simplicity, the wiring is not shown in FIG. 5A. FIG. 5B shows a circuit diagram of the light-emitting diode lamp of FIG. 5A. An ac power supply source is also shown. FIG. 5C shows the top plan view of the light-emitting portion. Inside this lamp, a rectifying circuit 11, a capacitor 12 and a current-stabilizing circuit 13 are fixed on a base plate 14 which, in turn, is engagingly fixed to the housing 15. A dc or quasi dc current is supplied from the current-stabilizing circuit 13 to the light-emitting portion 20, to cause the series units $SU_1$ to $SU_4$ provided within light-emitting portion 20 to emit light. Each series unit $SU_i$ includes a parallel connection of rows of light-emitting diodes connected in series.

Commerical ac voltage $E_{ac}$ varies, such as 100 V, 115 V or 220 V, depending on the countries. However, explanation will hereunder be made by assuming that the commercial ac voltage is 100 V. The alternating current of the effective voltage 100 V has a maximum voltage $E_m$ of about 140 V. Let us assume here that the voltage fluctuations are usually $\pm 5$ V, and that the maximum voltage fluctuations are $\pm 15$ V. Under such conditions, the device is required to operate at the voltage of $140-15=125$ V when the voltage is at the lowest level. Supposing that the driving current is 15 mA, that the capacitance which can be housed within the lamp is 10 μF at the maximum, and that the discharge time is 10 msec, the required voltage variation across the capacitor 12 is therefore about 15 V as approximated from the relation $\Delta Q = C \cdot \Delta V$. Accordingly, the voltage across the capacitor 12 will drop to $125-15=110$ V when discharged. It should be understood here that the voltage drop of the rectifying circuit 11 is disregarded. The current-stabilizing circuit 13 fixes the base-bias of the bipolar transistor $Q_0$ by the forward voltage drop of the diodes $D_1$ and $D_2$, to thereby supply a constant current. The resistor $R_0$ is a bias resistor for the prevention of the passage of excess current. The resistor $R_{10}$ is a large resistance for causing a current flow to the diodes. Suppose that a voltage of 5 V at the lowest is required for this current stablizing circuit, there can be supplied to the light-emitting portion 20 a voltage of $110-5=105$ V or higher. As shown in FIGS. 5B and 5C, in the instant example, the light-emitting portion is divided into 5 series units $SU_1$ to $SU_5$, and 3 rows of light-emitting diodes are connected in parallel within each series unit. A voltage of 21 V or higher is distributed to each series unit. Let us here assume that a light-emitting diode has the operating current of 5 mA and the operating voltage of 1.95 V. 10 individual of light-emitting diodes are series-connected in each row, and thus the sum of their operating voltages is arranged to be about 19.5 V. The current-limiting means $L_{11}$, $L_{21}$, $L_{31}$, $L_{12}$, up to $L_{35}$ are each comprised of a resistance, but it may be made with some other means such as a FET. A voltage of $21-19.5=1.5$ V or more is applied to each current limiting means $L_{ij}$.

Accordingly, the average resistance of $L_{ij}$ is $\overline{L_{ij}} \approx 1.5/5 \times 10^{-3} \approx 300\Omega$. The internal resistance of a single light-emitting diode can be selected to be about several $\Omega$, and the internal resistance of the series-connection of 10 individual light-emitting diodes can be selected to about several scores of $\Omega$ or lower, so that it is possible to obtain a sufficient balancing even at about 300$\Omega$. The threshold voltage of the light-emitting diodes in the whole light-emitting lamp device thus will be about 98 V, and the power efficiency thereof will be 70% or more (about 85%).

According to the instant example, the light-emitting portion 20 is divided into 5 series units, and each of these series units can be replaced by one fresh unit. In the event that any single light-emitting diode within any one series unit is disconnected, this particular entire row of diodes containing such disconnected diode will cease to emit light. However, the remaining two rows will continue to emit light, and other rows will maintain emission of light. Furthermore, the total current is rendered to a constant current, so that the current for the remaining two rows will increase. Within the other series units, all rows of diodes maintain emission of light. As will be understood, in case any one diode within any other series units is disconnected, only one row of diodes within the particular series unit ceases emission of light. Accordingly, very little inconvenience and disturbance is sustained at the time of such disorder. The respective rows of diodes may be disposed in a grouped fashion in each series unit. Then, a check-up for disconnection can be made easily. Also, it is possible to replace the light-emitting portion while the power supply portion is still connected to the device. Since the portion which serves as the heat source in the power supply portion is disposed close to the lamp base, the radiation of heat is effected quickly. It will be apparent that each row of light-emitting diodes can be formed as an replaceable element. Also, the connection of respective light-emitting diode rows can be arranged in various ways. For example, the total diode circuit may be divided into three series line, and each series line may include five diode rows connected in series.

It will be easy for those skilled in the art to change or modify the designing in accordance with such factors as power supply source voltage, the required amount of illumination and the operating voltage of the light-emitting diodes.

Figures 6A, 6B:
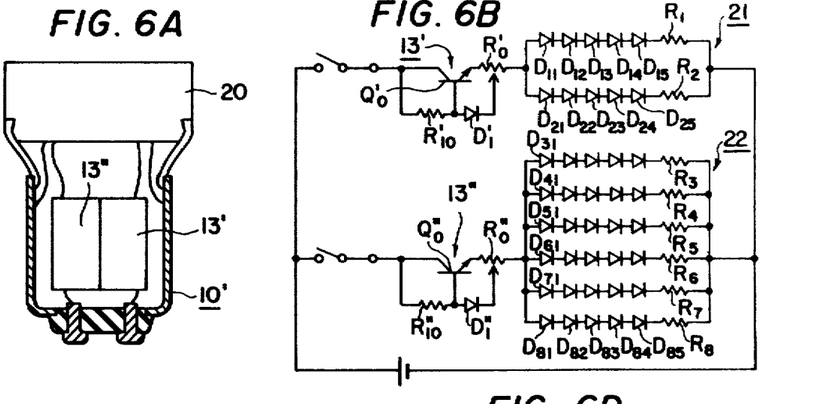
FIGS. 6A to 6D are a schematic cross sentional diagram, a circuit diagram, a plan view, and a partial cross sectional diagram of a light-emitting diode lamp according to another embodiment of the present invention.
Figure 6C:
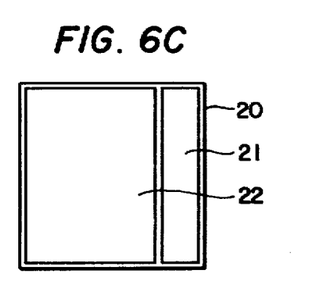

In FIGS. 6A to 6C, there is shown a red-color light-emitting lamp for automobiles. Let us here assume that the installed battery has a rating voltage of 12 V, and that the amplitude of fluctuations of the voltage ranges from 11.5 V to 15 V. The operating voltage of the red-light emitting diode is about 1.6 V to about 2.0 V. Therefore, 5 individual light-emitting diodes are connected in series to use 8 to 10 V, and current stabilization is carried out by utilizing the remaining voltage. The amount of light emitted is selected at an appropriate value by selecting the number of parallel connections. The illustrated lamp is designed so as to concurrently serve as the tail lamp and the brake lamp, and these lamps have their separate power supply sources and light-emitting portions. In FIGS. 6A and 6C, there are provided two current stabilizing circuits 13' and 13"

in the lamp base 10' and two light-emitting diode sections 21 and 22 in the light-emitting portion 20. The electric circuit is shown in FIG. 6B. Each of the current stabilizing circuits 13' and 13'' includes a bipolar-mode static induction transistor $Q_0'$ ($Q_0''$), a biasing diode $D_1'$ ($D_1''$), and resistors $R_0'$ and $R_{10}'$ ($R_0''$ and $R_{10}''$). The operation of current stabilizing circuits 13' or 13'' are similar to that of FIG. 5B. In the light-emitting portion 20, there are employed two rows of series connections each allowing a current of 7 mA to flow in the tail lamp portion 21, and six rows each allowing a current of 10 mA to flow in the brake lamp portion 22. As shown in the top plan view of FIG. 6C, separate independently replaceable tail lamp portion 21 and brake lamp portion 22 are provided. Similar to the example shown in FIGS. 5A to 5C, this instant example is such that no practical inconvenience and disturbance is noted from disorder of any single row of diodes, and the generated heat in the circuit of the power supply source portion is radiated through the lamp base.

Figure 6D:
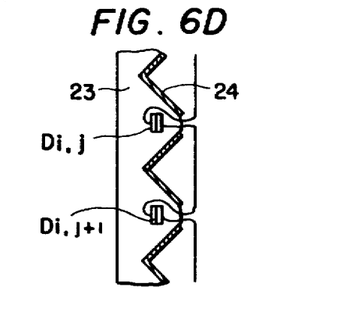

In each of the lamp portion 21 or 22, light-emitting diodes are assembled in an integrated mold structure as shown in FIG. 6D. A mold 23 of transparent epoxy resin surrounds light-emitting diodes in respective cone-shaped projecting portions. A reflecting film 24 made of aluminum or like material reflects lights emitted from the side surfaces of the light-emitting diodes toward the forward direction. The front surface of the epoxy mold may be projected spherically in front of each light-emitting diode chip to serve as a lens.

Explanation has been made with respect to a light-emitting diode lamp which can be used directly as a replacement for a conventional colored-light emitting display device. It should be understood here that the light emitted by the light-emitting diodes has a predetermined color, so that it is possible to make a display device which is much simpler than the corresponding conventional device. Also, the light-emitting diode is such that the volume per piece is extremely small and also that it is possible to arrange so that the emitting light can have directional ability. Therefore, it becomes possible to provide various kinds of displays which have been impossible with the conventional incandescent lamp display systems. For example, in the traffic display device as shown in FIG. 1A, it is possible to materialize a 3-color display with a device which could appear to be a single signal informing device, by disposing 3-color light-emitting diodes within a single common, area of the device. By providing 100~150 pieces of each of 3-color light-emitting diodes of red, yellow and green, respectively, there can be obtained a signal light which is several time brighter than any conventional such signal lamp. It is also easy to dispose several hundred pieces of light-emitting diodes within an area of about 200 mm². In such case, it is also possible to make series and parallel connections of light-emitting diodes, to arrange them so that even when the series-connections of light-emitting diodes are locally disconnected, the distribution of of the LED's is such that no disruption of light that is locally intensive in the degree of illumination will occur. If light-emitting diodes of different colors are employed, their operating voltages will be different from each other. Therefore, in case these different types of diodes are driven by a certain constant voltage, the number of the diodes which can be connected in series will accordingly become different. However, by adjusting the current value and/or the number of the parallel circuits, it is possible to cause the respective colors to have a substantially uniform brightness in their emitting lights. If red, yellow and green colors are used, it will be understood that, for lights of shorter wavelengths, the number of those light-emitting diodes which can be connected in series will become smaller, and the luminous efficiency also tends to decrease. However, human eyes are more sensitive to lights of shorter wavelengths, and therefore it is not very difficult to substantially equalize the brightness of these different colored lights emitted from the light-emitting diodes. Also, if a large number of light-emitting diodes, such as several tens to several hundred pieces, are lighted up simultaneously, it will be convenient from the viewpoint of use to assemble a plurality of light-emitting diodes into one unit and to construct the whole device with a plurality of such units. In the example of FIGS. 5A to 5C, the whole device is divided into 5 series units. It is also possible to further divide each of these units into respective rows of series-connected diodes. The greater the number of units is increased, the smaller will become the number of light-emitting diodes in each unit which is to be replaced in case of failure such as disconnection, and thus such arrangement is economical.

There are many ways of combining respective units. The conditions for combination, however, are that there be no problem from the aspect of visuality and that the replacement of any unit at the time of disorder be easy.

Figure 7A:
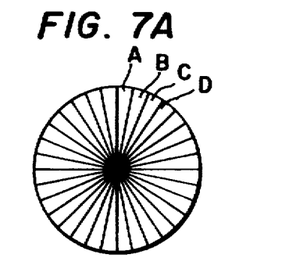
FIGS. 7A to 7C are schematic diagrams for showing various arrangements of light-emitting diode units.
Figure 7B:
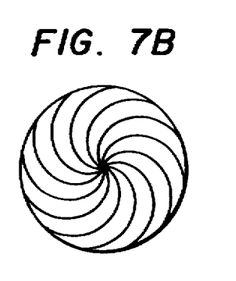
Figure 7C:
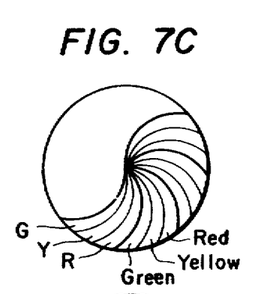

In FIGS. 7A to 7C, there are shown examples in which the respective units are formed to have an identical shape to construct a circular display device. FIG. 7A shows an example in which a circle is equally divided into same sector shapes so that each of the regions A, B, C, ... is provided as a single unit. It is a matter of course that these regions A, B, C, ... are formed into fine divisions to reduce the inconvenience and disturbance in the event of disorder and to provide more effectiveness from practical point of view. If a circular circumference of 360° is to be divided from 12 equal divisions into 36 equal sectors, it will be understood that, even when any one unit is disconnected, there will arise little adverse effect, and that moreover such fine division is preferable from the aspect of visuality also. It is needless to say that division which is rougher than that mentioned above may be employed. In FIG. 7B is shown a modification of the division mentioned above. In this instant modification, the respective units are not divided in linear fashion but it represents an instance wherein a circular plane is divided in curved fashion from the view point of visuality.

If the device is comprised of a number of divided units, it will be effecitve to form intermediate units each representing an assembly of a plurality of units, from the aspect of avoiding troublesome procedure of replacement and attachment. FIG. 7C shows a structural example wherein the respective units of red, yellow and green are incorporated as a single intermediate unit. In this instance, there are provided the advantages such that the identification of the specific disordered unit is easy and that the time of replacement is shortened. The currently employed traffic signals are such that red, yellow and green colors are disposed at different sites relative to each other on the display device. In contrast thereto, according to the present invention, it is possible to produce illumination of red, yellow and green in time-lag fashion from a same site on the display device, so that the cost of installment of a signal device can be greatly reduced. In this case, the respective units of red, yellow and green may have different areas corresponding to the number of rows of light-emitting diodes in the respective units.

Figure 8A:
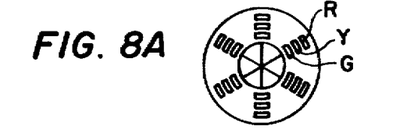
FIGS. 8A and 8B are schematic diagrams for showing a combination of light-emitting diode arrangement and a cover glass.
Figure 8B:
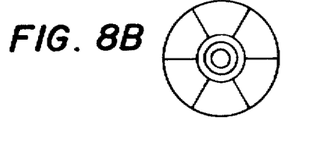

Usually, the respective chips of light-emitting diodes are coated with, for example, an epoxy resin to protect the light-emitting diode. For the use of display device outdoors, it is desirable to effect its protection by some means against natural environment such as wind, snow and rain. One such example employs a cover glass plate which is capable of adjusting the diffusion of light and the direction of emission of light, and the like. By making use of such means as mentioned above, it is possible to enlarge the area of illumination of the respective units. For example, even with a structure which represents that a circle is divided into six sectors, the respective lights emitted can be discerned externally as being almost uniform in display. For example, by relying on a simple manner of disposition as shown in FIG. 8A, the respective units are disposed accordingly. By adding thereto a light-diffusing plate such as the cover-glass lens as shown in FIG. 8B, to shade-off the plane of illumination, it is also possible to design as if the entire area of the signal light display is illuminating. Thus, it is possible to produce a very effective light-emitting plane by relying on an extremely simple manner of arrangement.

Further, when a multiplicity of light-emitting diodes are grouped in a plurality of series connection lines and jointly disposed in one display panel, local distribution of display can be prevented even upon occurrence of disconnection accident if the light emitting diodes of the respective lines are mixedly disposed in the panel. For example, light-emitting diodes belonging to the same line may be arranged not to be adjacent to each other in the radial and the angular (circumferential) directions in a circular display panel, or not to be adjacent to each other in the x- and y-directions in a rectangular display panel, etc. Those arrangement will keep the total area display even upon disconnection accident.

It is needless to say that the embodiments and examples of the present invention are not limited to those described above. It should be understood that those various kinds of traffic signal devices as shown in FIGS. 1A to 1C can be arranged to operate with a very small power dissipation and to provide a number of different types information. Also, it is possible to provide a signal display device using a conventional power supply system, which operates at a low power dissipation and at a high efficiency merely by replacing the light-emitting portion. In similar way, the present invention can be utilized for other kinds of colored-light emitting display devices. The light-emitting diode display devices according to the present invention operate at a much smaller power consumption and have a much longer service lifetime as compared with conventional display devices using incandescent lamps, and their maintenance requires essentially no special care, and thus their economical value is great.

What is claimed is:

1. A light-emitting diode (LED) lamp comprising:
a housing including a lamp base of a predetermined shape adapted for effecting electrical connection to a commercial AC power source, said AC power source having a predetermined maximum voltage;
a current-regulating means electrically connected to said lamp base and disposed in said base to facilitate dissipation of heat generated by said current-regulating means through said base; and
a display panel connected mechanically to said housing and electrically to said current regulating means and including a multiplicity of light-emitting diodes, groups of said diodes being connected in series, said series connected group having an operating threshold voltage at least about one half of said predetermined maximum voltage said groups being electrically connected in parallel said multiplicity of light emitting diodes being driven simultaneously by the current from said regulating means.

2. A light-emitting diode lamp according to claim 1, wherein: said display panel comprises a plurality of display units, each display unit including at least one series connection of substantially the same number of light-emitting diodes.

3. A light-emitting diode lamp according to claim 2, wherein: said plurality of display units are connected in series and each of said display units includes a parallel connection of a plurality of said series connection.

4. A light-emitting diode lamp according to claim 2, wherein: said plurality of display units are connected in parallel.

5. A light-emitting diode lamp according to claim 2, wherein: said plurality of display units are connected in a plurality of series connections which are connected in parallel.

6. A light emitting diode lamp according to claim 1, 2, 3, 4 or 5, wherein:
said display panel comprises a reflector having concave reflecting surfaces registered with the respective light-emitting diodes.

7. A traffic signal system adapted to be driven by a commercial AC power signal having a predetermined maximum voltage, comprising: a red and a green signal lamp, each signal lamp including a plurality of display units connected in parallel, each display unit including a plurality of series connected light-emitting diodes and a current adjusting means, said plurality of series connected light-emitting diodes having an operating threshold voltage of at least about one half of said predetermined maximum voltage.

8. A light-emitting diode display device adapted to be driven by a commercial AC power source having a predetermined maximum voltage said device comprising:
a display surface having a plurality of sections; and
a multiplicity of light-emitting diodes disposed in each of said sections, groups of said light-emitting diodes being electrically connected in series such that said group has an operating threshold voltage at least approximately one half of said predetermined maximum voltage, said groups being electrically connected in parallel,
means for limiting the current through each group in said section,
said light-emitting diodes in each section emitting lights of a single color,
said display surface including a first number of sections emitting light of a first color and a second number of sections emitting light of a second color.

9. A light-emitting diode display device according to claim 8, wherein: said display surface further includes a third number of sections emitting light of a third color.

10. A light-emitting diode display device according to claim 8 or 9, wherein: said first color is red and said second color is green.

11. A light-emitting diode display device according to claim 9, wherein: said first color is red, said second color is green and said third color is yellow.

12. A light-emitting diode (LED) display adapted to be driven by a commercial AC power source having a predetermined instantaneous maximum voltage ($E_m$), said display comprising:

at least one group of luminescent units, each said luminescent unit comprising a plurality of serially connected LED's, each of said units having an operating threshold voltage ($V_{th}$) equal to at least approximately one half of said predetermined maximum voltage ($E_m$) and being electrically connected in parallel to the other luminescent units in said group so that all units in said group are concurrently driven by said AC power source; and current limiting means for limiting the current through each of said units.

13. Light-emitting diode display according to claim 12, wherein: said plurality of light-emitting diodes simultaneously emit lights of a same color.

14. Light-emitting diode display according to claim 12, further comprising: a rectifying circuit for rectifying an alternating current from said AC source and supplying a rectified electric power to said parallel connection of units.

15. Light-emitting diode display according to claim 14, further comprising: a charge-storing means for charging and discharging electric charge, connected between said rectifying circuit and said parallel connection.

16. Light-emitting diode display according to claim 12, further comprising: a total current-limiting means connected in series with said parallel connection for supplying a limited total current thereto.

17. Light-emitting diode display according to claim 16, wherein: said current limiting means comprises a current-adjusting resistance in each unit serially connected to said series connection of light-emitting diodes.

18. Light-emitting diode display according to claim 17, wherein: said total current limiting means includes a current stabilizing circuit for supplying a predetermined constant current.

19. Light-emitting diode display according to claim 16, further comprising: a housing for accommodating said group of luminescent units, including a lamp base of a predetermined shape for providing electrical connections to said source; said total current-limiting means being thermally connected to said lamp base.

20. Light-emitting diode display according to claim 12, further comprising: a housing for accomodating said group of luminescent units and for providing electrical connections to said source.

21. Light-emitting diode display according to claim 12, further comprising: at least one other group of luminescent units.

22. A light-emitting diode lamp adapted to be driven by chargeable battery, comprising:

a housing including a standard lamp base having at least first and second terminals;

means for limiting current flowing therethrough and electrically connected to said first terminal, and disposed at least partially in said lamp base such that heat generated by said means for limiting current is dissipated through said lamp base;

a light-emitting surface coupled to said housing; and light emitting diode circuitry provided in said light-emitting surface and electrically connected between current-limiting means and said second terminal, the circuitry including a plurality of lines connected in parallel, each line including a current-adjusting resistor and a plurality of light-emitting diodes connected in series, all the light-emitting diodes in said circuitry being arranged to be driven simultaneously.

23. A light-emitting diode lamp according to claim 22, wherein:

said housing includes a third terminal;

another means for limiting current flowing therethrough and electrically connected to said third terminal and disposed at least partially in said lamp base with low heat resistance therebetween; and another light-emitting diode circuit provided in said light-emitting surface and electrically connected between said third current-limiting means and said second terminal, said another circuit including a plurality of lines connected indiodes connected in series, al the light-emitting diodes in said circuitry being arranged to be driven simultaneously.

24. A light-emitting diode lamp according to claim 22 or 23, wherein:

said light-emitting surface comprises a reflector having concave reflecting surfaces registered with the respective light-emitting diodes.

25. A light-emitting diode (LED) display adapted for cooperating with a standard light fixture, comprising:

a housing including a base portion configured to cooperate with said standard fixture and to effect first and second respective electrical connections with said fixture;

at least one group of luminescent units, each said unit comprising a plurality of LED's and a current adjusting device electrically connected in series, each of said units being electrically connected in parallel between said first electrical connection with said fixture and a common node; and current limiting means, for limiting the current flow therethrough, disposed at least partly within said base portion such that heat generated by said current limiting means is dissipated through said base portion and electrically connected between said common node and said second electrical connection with said fixture.

26. A light-emitting diode (LED) display adapted to be driven by a commercial AC power source having a maximum voltage $E_m$, said display comprising:

at least two groups of luminescent units, each group including a plurality of luminescent units connected in parallel and each unit including a plurality of LED's connected in series, the respective groups being connected in series so as to drive all the LED's in the respective groups simultaneously from said AC power source, said series connected groups having an operating threshold voltage at least about one half of said maximum voltage $E_m$; and current limiting means for limiting the current through each of said units.

27. Light-emitting diode display according to claim 26, wherein: said respective groups of luminescent units have substantially the same electric and optical characteristics.

28. The display of claim 27 further comprising a current limiting device connected in series with said respective groups of luminescent units.

29. Light-emitting diode display according to claim 28, wherein: said current limiting means comprises a current-adjusting resistance in each luminescent unit electrically connected in series with said plurality of serially connected LEDs.

30. Light-emitting diode display according to claim 28 wherein: said current limiting device has a saturating current versus voltage characteristics.

31. The display of claim 17, 18, or 30 wherein: said operating threshold voltage is at most about 0.9 of said maximum voltage.

32. A light-emitting diode (LED) display adapted to be driven by an AC power source, said source providing a voltage $E_{ac}$, where $E_{ac} = E_m \sin wt$, said display comprising a plurality of luminescent units, each unit comprising a plurality of series-connected LED's, said LED's emitting substantial light only in response to voltages applied across said unit at least equal to a predetermined operating threshold voltage $V_{th}$, where $V_{th} \geq 0.5\ E_m$, means for electrically connecting respective ones of said units in parallel to form respective groups of units;

current limiting means for limiting the current through each of said units; and means for electrically connecting said groups of units to said source such that each unit in a group is concurrently drawn by said source.

33. The display of claim 32 wherein each unit further comprises a current limiting resistance.

34. The display of claim 32 or 33 further comprising means for rectifying said voltage $E_{ac}$.

35. The display of claim 34 wherein $V_{th}$ is equal to at least approximately 0.9 $E_m$.

36. The display of claim 34 wherein $V_{th}$ equals approximately $\sqrt{2} \times E_m$.

37. The display of claim 34 wherein $V_{th}$ equals a value in the range of approximately 0.6 $E_m$ to approximately 0.7 $E_m$.

38. The display of claim 32 or 33 wherein $V_{th}$ is equal to at least approximately 0.9 $E_m$.

39. The display of claim 32 or 33 wherein $V_{th}$ equals approximately $\sqrt{2} \times E_m$.

40. The display of claim 32 or 33 wherein $V_{th}$ equals a value in the range of approximately 0.6 $E_m$ to approximately 0.7 $E_m$.

* * * * *